J. D. MINES.
Improvement in Feeding Devices and Tell-Tales for Mills.
No. 129,577. Patented July 16, 1872.
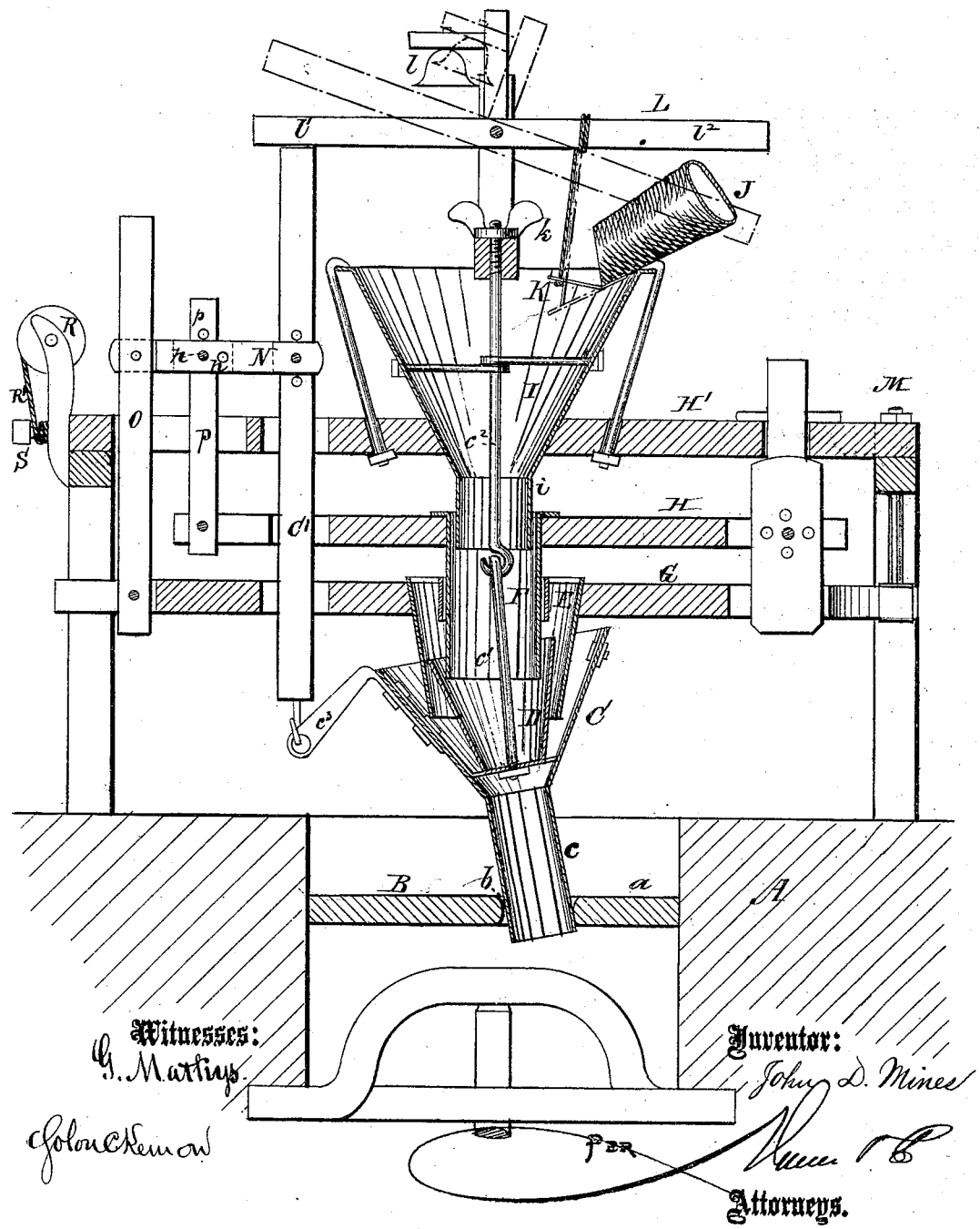
Witnesses:
G. Mattius
Colon C. Kemon
Inventor:
John D. Mines
per
Attorneys.

UNITED STATES PATENT OFFICE.

JOHN D. MINES, OF MOFFATT'S CREEK, VIRGINIA, ASSIGNOR TO HIMSELF AND WILLIAM STEELE, OF SAME PLACE.

IMPROVEMENT IN FEEDING DEVICES AND TELL-TALES FOR MILLS.

Specification forming part of Letters Patent No. 129,577, dated July 16, 1872.

Specification describing a Self-Regulating Feed and Tell-Tale for Mill-Burrs, invented by JOHN D. MINES, of Moffatt's Creek, in the county of Augusta and State of Virginia.

The invention consists in feeding grain through the eye of a burr-runner by means of a discharge-funnel projecting thereinto, a cup rigidly placed in the funnel, and a tube that reciprocates in the cup; secondly, it consists in vibrating the discharge-funnel so as to tilt the cup and assist the feed; thirdly, it consists in making the discharge-funnel move the tube that reciprocates in its cup; fourthly, it consists in providing the grain-supply spout with a flexible valve, which is attached to a lever that is vibrated from the discharge-funnel, so as to ring a bell whenever the flow of grain fails to keep the valve open.

The drawing is a vertical section of my apparatus mounted on the frame-work of a pair of millstones.

A in the drawing represents the runner of a pair of mill-burrs, $a$ the eye thereof, and B a plate made fast in said eye and perforated eccentrically at $b$. C is a discharge-funnel, suspended by jointed rods $c^1$ $c^2$ to a frame at top, while it has a crooked bar, $c^3$, which receives a hook of bar C'. It also has a neck, $c$, entering perforation $b$, whereby the runner rotates said neck and shakes and tilts the funnel with the cup D fastened thereto. E is a conical tube which receives cup D, while F is a tube that projects into said cup. These tubes E F are, respectively, made fast in the fixed beams G H. I is a hopper, whose neck $i$ extends into tube F, while its upper part receives the grain from a trough or tubular feed-spout, J. The latter is placed in an inclined position on the edge of hopper, and is provided with a flexible valve, K. The outer edge of this valve is connected by a cord, $k$, with one arm of a pivoted bar, L, to which is attached the bell $l$. Thus, whenever the bar is vibrated, the bell will ring. The hopper I is held in position by hooked and threaded rods, or in any other suitable manner. M represents the entire frame, which supports hopper and its feed connections, and which is made to rest on the casing of the burrs. The bar C' passes loosely through the beams G H H', and is pivoted to a bar, N, which is itself pivoted to the bar O. By this arrangement of parts, as the discharge-funnel C is turned and raises the bar $c^3$ the latter raises the bar C', vibrates lever L, and signals to the miller that the grain is no longer being fed. The bar H, which is pivoted in front to the piece Q and holds the tube F, being attached by the bar P to the connection N, is also lifted and carries up and down with it the tube F. By this movement of the tube F within the cup D the grain is caused to be gradually distributed over the rim of said cup. The throw of the tube F in an upward and downward direction in the cup may be adjusted to regulate the amount of feed by simply adjusting the bar P nearer to or further from the fulcrum of the lever N in the holes $n$ $n$. The tube F may be allowed to protrude more or less into the cup D by means of the holes $p$ in the bar P. The whole frame M may be adjusted to regulate the degree to which the discharge-spout shall extend into the eye of burr by the cord R' passing over pulley R and fastened to a screw, S.

The operation is as follows: The grain passes from some vessel or chamber into the spout D, and, as its current presses against the flexible valve K, the latter is kept open while the grain passes down into the cup D. As the revolving burr vibrates the discharge-funnel C back and forth, said funnel, by the aid of the intermediate mechanism described, reciprocates tube F vertically in the cup and distributes over the latter a gradual and uniform supply of grain. When the current ceases to flow through spout J the lever L, whose arm $l^1$ is slightly heavier than the arm $l^2$, lifts the valve and stops in a horizontal position. This brings the arm $l^1$ within reach of the upwardly-movable bar C', which vibrates it and rings the signal-bell.

Having thus described my invention, what I claim as new, and desire to secure by Letters Patent, is—

1. The combination with runner A, having the central eye $a$, of a discharge-funnel, C, cup D, and reciprocating tube F, arranged to feed the grain, as described.

2. The subject-matter of above claim, in combination with the eccentrically-perforated plate B, arranged to vibrate the funnel C, as described, for the purpose of tilting cup D and thereby assisting in the feed.

3. The vibratory funnel C having bar $c^3$ and connected with the tube F by the bar C', lever N, bar P, and beam H, as and for the purpose set forth.

4. The spout J, provided with valve K having cord $k$, in combination with lever L having bell $l$ attached thereto, the bar C', and the vibratory discharge-funnel C, as and for the purpose described.

To the above specification of my invention I have signed my hand this 12th day of June, A. D. 1872.

JOHN D. MINES.

Witnesses:
SOLON C. KEMON,
CHAS. A. PETTIT.